United States Patent
Hidaka et al.

(10) Patent No.: US 7,203,195 B2
(45) Date of Patent: Apr. 10, 2007

(54) METHOD FOR PACKET TRANSFERRING AND APPARATUS FOR PACKET TRANSFERRING

(75) Inventors: Minoru Hidaka, Kodaira (JP); Mitsuru Nagasaka, Kokubunji (JP); Satoru Tsukada, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 867 days.

(21) Appl. No.: 10/077,744

(22) Filed: Feb. 20, 2002

(65) Prior Publication Data
US 2003/0103505 A1    Jun. 5, 2003

(30) Foreign Application Priority Data
Dec. 4, 2001  (JP) .............................. 2001-369451

(51) Int. Cl.
*H04L 12/56* (2006.01)
*H04L 12/28* (2006.01)
*G06F 3/00* (2006.01)

(52) U.S. Cl. .................. 370/392; 370/389; 719/314

(58) Field of Classification Search ........ 370/351–356, 370/389, 392, 401, 474, 466
See application file for complete search history.

(56) References Cited

U.S. PATENT DOCUMENTS

| | | | |
|---|---|---|---|
| 6,839,346 B1* | 1/2005 | Kametani | 370/389 |
| 2001/0050914 A1* | 12/2001 | Akahane et al. | 370/382 |
| 2003/0026260 A1* | 2/2003 | Ogasawara et al. | 370/392 |
| 2003/0037042 A1* | 2/2003 | Kametani | 707/3 |

FOREIGN PATENT DOCUMENTS

| | | |
|---|---|---|
| JP | 11-331268 | 5/1998 |
| JP | 2002-504285 | 6/1998 |
| JP | 2001-326693 | 5/2000 |
| WO | WO 98/57464 | 6/1998 |

* cited by examiner

*Primary Examiner*—Wing Chan
*Assistant Examiner*—Venkatesh Haliyur
(74) *Attorney, Agent, or Firm*—Reed Smith LLP; Stanley P. Fisher, Esq.; Juan Carlos A. Marquez, Esq.

(57) ABSTRACT

A method or apparatus for transferring packets, which enables fast lines to be housed for a high load service that requires many calculations in an edge node in a communication network, in which data flows are concentrated. Information obtained from an input packet is held in a table entry in the apparatus and whether to perform such a processing as encryption, etc. is decided according to the state of the source or destination of the input packet or the internal state of the apparatus, thereby performing such a processing as encryption only for necessary packets and reducing the number of calculations.

13 Claims, 6 Drawing Sheets

FIG.7

| INPUT INFORMATION | | OUTPUT INFORMATION | | | | |
|---|---|---|---|---|---|---|
| INPUT LINE NUMBER | INPUT DATA LINK LAYER IDENTIFIER | OUTPUT LINE NUMBER | OUTPUT DATA LINK LAYER IDENTIFIER | DATA LINK LAYER STATE | PACKET FILTERING CONDITION | PROCESSING IDENTIFIER |
| 1 | 0002 | 2 | 0004 | DATA COMMUNICATION | 0021 | 1001 |
| 1 | 0011 | - | - | LINK ESTABLISHED | 8021,C021,C023 | 0002 |
| 1 | 0010 | 2 | 0004 | DATA COMMUNICATION | 0021 | 1002 |
| 2 | 0005 | - | - | LINK ESTABLISHED | 8021,C021,C023 | 0003 |
| 2 | 0004 | 1 | 0002 | DATA COMMUNICATION | 0021 | 1003 |

FIG.8

| INPUT INFORMATION | | OUTPUT INFORMATION | | | | |
|---|---|---|---|---|---|---|
| INPUT NETWORK LAYER IDENTIFIER | INPUT TRANSPORT LAYER IDENTIFIER | OUTPUT NETWORK LAYER IDENTIFIER | TRANSPORT LAYER STATE | PACKET FILTERING CONDITION | PROCESSING IDENTIFIER | OUTPUT DATA LINK LAYER IDENTIFIER |
| 0001 | - | 0002 | - | - | - | 0004 |
| 0001 | - | 0003 | - | - | - | 0004 |
| 0002 | - | 0001 | - | - | - | 0002 |
| 0003 | - | 0001 | - | - | - | 0002 |
| 0011 | 0004 | 0002 | TCP SYN WAITING | TCP DP 1020 | 0003 | 0004 |
| 0011 | 0004 | 0002 | TCP ACK WAITING | TCP DP 1020 | - | 0004 |
| 0005 | 0004 | 0004 | TCP SYN WAITING | TCP SP 1020 | 0004 | 0004 |
| 0005 | 0004 | 0004 | TCP ACK WAITING | TCP SP 1020 | 0005 | 0004 |

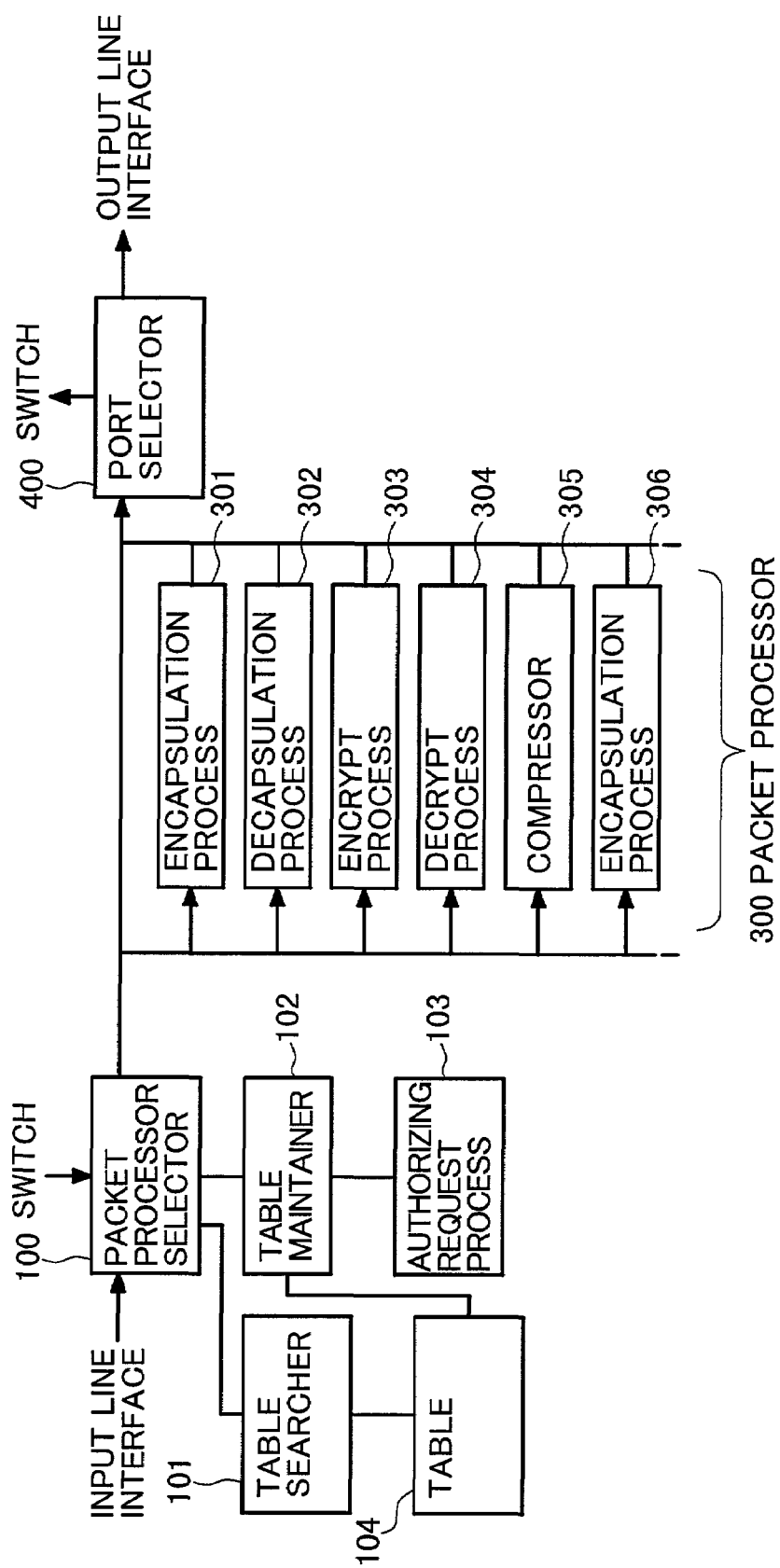

US 7,203,195 B2

METHOD FOR PACKET TRANSFERRING AND APPARATUS FOR PACKET TRANSFERRING

BACKGROUND OF THE INVENTION

The present invention relates to a technique concerning a communication network, especially communication devices required to compose a packet exchange network. More particularly, the invention relates to a technique to process each packet that prevents overhead flow of the packets under packet transfer in a communication network. Processing to be applied to packets is mainly encryption for security in data transfer, compression, and capsulation.

FIG. 10 shows a block diagram of a communication network in which a packet transferring apparatus is used as each node. Generally, a communication network is composed of terminals (T1, T2, T3, T11, etc.) and nodes. Each ellipse shown in FIG. 10 denotes a communication network composed of plural nodes. In this communication network, communication is done between terminals, which are end points of the communication. When two end points are connected to each other via a node, communication is also enabled between terminals that are not connected directly to each other. A node relays communication with a terminal or another node such way. The IETF (Internet Engineering Task Force) rules the relay of communication in each communication network. A communication network that conforms to the Internet Protocol ruled by the IETF is referred to as an Internet IN. An Internet IN is composed of plural communication networks managed by different managers and connected to each other. When communication is done more and more on a network composed of nodes managed by different managers just like such an Internet IN, however, discrimination will have to be made between nodes managed by a manager of a network to which terminals belong and other nodes from aspects of management, safety, or operability. Hereinafter, a node that connects between networks managed by different managers is referred to as an edge node or edge router.

The networks of an Internet IN are divided into two types; one is a network usually managed by electric communication enterprises and allowed to be connected by an unspecific number of users; and another is a network managed by users or users authorized to manage the network and allowed to be connected among the network's member users. Hereinafter, the latter is referred to as private networks.

The former network is also divided into two types; one is a network managed by a provider who provides users with Internet connection services; and another is a network managed by a carrier who provides users simply with line connection services.

Hereinafter, a network managed by the provider who provides users with Internet connection services is referred to as an ISP network (ISP1, ISP2). A network managed by the carrier who provides users with line connection services is referred to as a carrier network (CN1, CN2). Edge routers in each of the following networks is referred to as private network edge routers PE1, PE2, ISP network edge routers ER1, ER2, and carrier network edge routers CE1, CE2.

A private network is connected to the Internet in two ways; direct connection to an ISP network ISP1 just like the private network PN1 and connection to the ISP network ISP2 via a carrier network CN1 just like the private network PN2.

Data is transferred as packet data in such a network. For a packet transferring method and a packet transferring apparatus, the packet transferring processing uses information handled in plural layers as data link layer, network layer, transport layer, etc. in a network model (an OSI reference model defined by the International Standard Organization).

FIG. 4 shows an example of a packet. A packet is nesting-structured as follows. When a transport layer header TLH is added to transport layer data TL_DATA, the result becomes network layer data NL_DATA. When a network layer header NLH is added to network layer data NL_DATA, the result becomes data link layer data DL_DATA. When a data link layer header DHL and a data link layer trailer DLT (depending on the data link layer protocol) are added to data link layer data DL_DATA, the result becomes a data link layer packet. A data link layer packet is also referred to as a frame FL.

Putting packet data in such a nesting structure is referred to as encapsulation. Generally, encapsulation is a method that provides a packet or a whole frame handled in a layer protocol in a hierarchical network system with header information of another protocol, thereby the packet or frame is handled as a payload. On the contrary, deleting such header information from a packet or frame to take out data therefrom is referred to as decapsulation.

Usually, packets are transferred in two ways; one is a way where a node is required just to process the header information of a subject layer in each packet; and another is a way where the node is required to process the whole data of each packet completely. The former example (header processing) is a route selection in the network layer. In this case, the output destination of a packet can be decided just by processing the network layer header information in the packet. On the other hand, sometimes the whole data in a packet must be processed. In this case, encryption, decryption, encapsulation, or decapsulation is done for the packet.

The private network can also be connected virtually by using a tunneling technique. Hereinafter, packet encapsulation required for tunneling will be described. In the case of FIG. 1, tunneling means a method that a packet transferred from the terminal T1 to the terminal T3 is encapsulated to a packet to be transferred from the edge router PE1 to the edge router PE3, thereby the route between edge routers PE1 and PE3 existing in a route denoted by a broken line in FIG. 1 is regarded as a virtually connected route. This virtually connected route is referred to as a tunnel TN1. A concrete method of the tunneling is encapsulation of a packet with use of a new header, thereby transferring the encapsulated packet according to the new header instead of processing the encapsulated packet in the processing layer. In the case of FIG. 1, tunneling means a processing that a new network layer header is added to a packet sent by the terminal T1 and the packet is transferred to the edge router PE3 according to the added network layer header information, then the edge router PE1 deletes the added header, thereby the packet sent from the terminal T1 is taken out.

FIG. 5 shows a configuration of a packet in a network layer, which is encapsulated in the network layer. In this encapsulation, a packet having a network layer header NLH shown in FIG. 4 and including data link layer data DL_DATA is composed as new network layer data T_NL_DATA. And, a new network layer header T_NLH is added to the packet, thereby the portion becomes new data link layer data DL_DATA2. This data link layer data DL_DATA2 is processed as a network layer packet on the basis of this network layer header T_NLH information until it is decapsulated. In this decapsulation, the network layer header T_NLH is deleted according to this network layer header T_NLH information at a node to which the packet arrives and the network layer data T_NL_DATA is restored to the original network layer packet, that is, the original data link layer data DL_DATA. The restored data is transferred as a network layer packet according to the network layer header NLH information.

When a terminal communicates with another, the unit of data to be sent/received in layers lower than the transport layer are respective packets. The unit of data to be sent/received in layers higher than the session layer is a group of continuous packets. Hereinafter, such a packet group is referred to as a packet flow.

An encryption technique becomes a very important item for concealing data of the above packet flow to be transferred in the network shown in FIG. 1.

Conventionally, each encryption processing has been done by an application program on the subject terminal to process each packet flow or by a node. The encryption is done in two ways; one is a way where the data part in each packet is encrypted; and another is a way where tunneling (encapsulation) is done for packet data, thereby the whole packet data including a network layer header, which is information transferred in a private network, is encrypted.

The way to encrypt whole packet data is applied for the packets, passing through such routes as cannot be identified by network managers in the Internet, in order to maintain the safety of the data running through the routes as well as to conceal information of the routes where the packets are passing, in other words, in order to keep information of the network layer header being transferred in a private network to which the subject terminal belongs, away from every person who can recognize the packet at a node in a route where the packets are passing.

Next, a description will be made for how a packet is to be encapsulated for encryption with reference to FIGS. 5 and 6.

FIG. 6 shows a configuration of a packet encrypted for encrypted tunneling. The network layer header of the packet is also encrypted at this time. A new network layer header T_NLH is added to the packet as an encapsulated header. The new header T_NLH is needed to pass the encapsulated packet T_NL_DATA through an ISP network that functions as a tunnel. In this encryption, data T_NL_DATA to be encapsulated is encrypted into encrypted encapsulated data ENCRYPTED. A network layer header NLH having address information of a private network is encrypted such way and the header NLH passes a node in the subject ISP network as encrypted data ENCRYPTED, so that it is difficult for any third person to obtain the value of the network header NLH.

Packets pass each node as a packet flow. Each of conventional packet transferring apparatuses, therefore, comes to encrypt or decrypt each packet flow passing through a route up to the counterpart packet transferring apparatus. In this case, an edge node has encrypted every packet passing through a tunnel route, that is, a route up to the counterpart edge node that decrypts those packets.

Each of the conventional packet transferring apparatuses has not identify any terminal that has generated a subject packet flow to decide whether to encrypt or decrypt part of the packet flow so as to encrypt only some packets that must be encrypted.

When such a packet transferring apparatus is used as an edge node, packet flows from the network to which the edge node belongs are concentrated. When an edge node executes encryption that calculates data more than the packet header processing, the number of packets to be processed comes to be limited in a node in which packet flows are concentrated due to the delay of the calculation for encryption. This is why efficiency of packet processings must be more improved to solve the problem.

SUMMARY OF THE INVENTION

In order to solve the above problem, the packet transferring apparatus of the present invention is provided with identifying means that identifies a user or processing content for each packet flow. The apparatus is also provided with means that identifies the state of each packet flow, thereby changing or selecting a processing appropriately to the packet data included in the identified packet flow. The apparatus is further provided with means that decides whether to perform such processings as encryption for each packet. The apparatus is further provided with means that changes processings according to the packet information and the internal state of itself during a packet transferring processing.

The identifying means includes a processing discriminator that extracts address information, etc. from the header information of an input packet to know the state of the packet flow, a table information searcher that holds the result of the discriminator, a part that decides a processing for each packet, and an exclusive processor provided for each processing to be applied to packets.

More concretely, according to the packet processing method of the present invention, a processing to be applied to packet data in a packet flow is selected for each inputted packet flow and the selected processing is performed for the packet data. The processing selection can be done according to an input line to which the packet flow is inputted or an identifier included in the packet data. Concretely, the processing is selected by referring to a table where an input line to which a packet flow is inputted and an identifier included in the packet data are corresponded to a processing to be selected. The processing to be applied to such packet data is one of encapsulation, decapsulation, encryption, decryption, compression, expansion, etc. or a combination of those processings.

The network system of the present invention includes plural communication networks, terminals belonging to each of those communication networks, and edge nodes for relaying communications between the communication networks. Packet flows are communicated between terminals via an edge node and the edge node performs a selected processing for each packet flow according to the characteristic (for example, sender, receiver, requested processing, etc.) of the packet flow. The typical processing performed by the edge node is encryption. Encryption includes encryption to be done only for the data part in each packet and encapsulation of packet data.

The edge node of the present invention is provided with a packet processing apparatus composed of a processor selector that extracts identification information of a data flow of an inputted packet from the packet; a processing selecting table that holds a pair of data items that are identification information and a processing to be applied to a target packet in advance; a table searcher that searches information in the processing selecting table according to a search key that is identification information extracted by the processor selector; a packet processor that performs a processing for a packet independently according to the result of searching in the processing selecting table; and a destination selector that transfers a processed packet to a destination. The edge node can thus extract identification information that denotes the characteristic of a data flow of each inputted packet from the header information of the packet. The identification information is, for example, such user information as a source address, a destination address, etc.

The packet processing apparatus provided for the edge node of the present invention may also be composed of a processor selector that decides the source of an inputted packet; a processing selecting table that holds a pair of data items that are identification information and a processing to be applied to a packet in advance; a table searcher that searches information in the processing selecting table according to a search key that is the source of the packet decided by the processor selector; a packet processor that performs a processing independently for a packet according to the result of searching in the processing selecting table; and a destination selector that transfers a processed packet. The edge node can thus decide an input line to which a packet is inputted as the source of the packet and decide the source of an inputted packet from the header information of the packet.

BRIEF DESCRIPTION OF THE DRAWINGS

FIG. 7 is a configuration of a table used to select a processor according to the present invention;

FIG. 8 is a configuration of a table used to select a processor according to the present invention;

FIG. 9 is a logical block diagram of a packet processor provided in the edge node of the present invention;

DETAILED DESCRIPTION OF THE PREFERRED EMBODIMENTS

Figure 5:
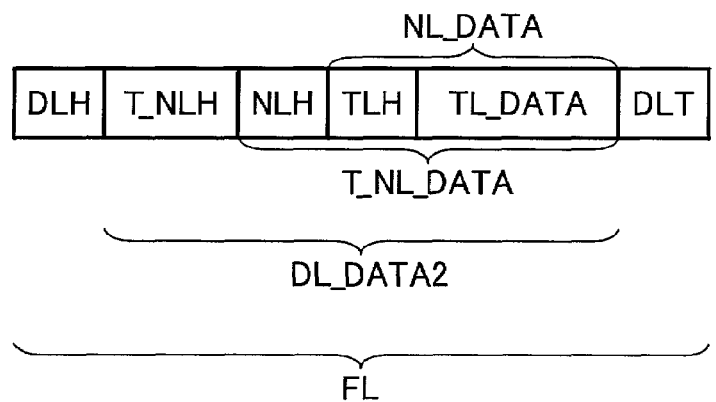
FIG. 5 is a concept chart for denoting a configuration of an encapsulated packet.
Figure 6:
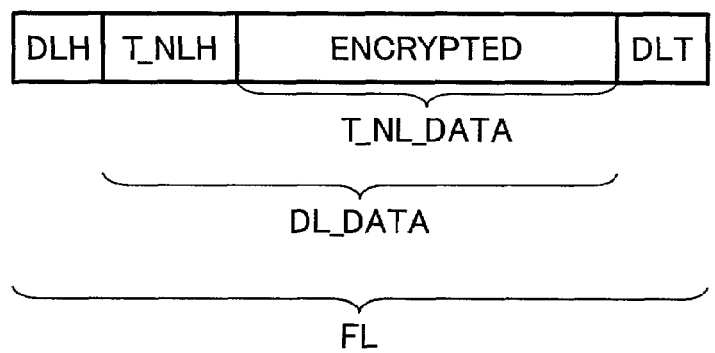
FIG. 6 is a concept chart for denoting a configuration of an encapsulated packet whose data part is encrypted.
Figure 10:
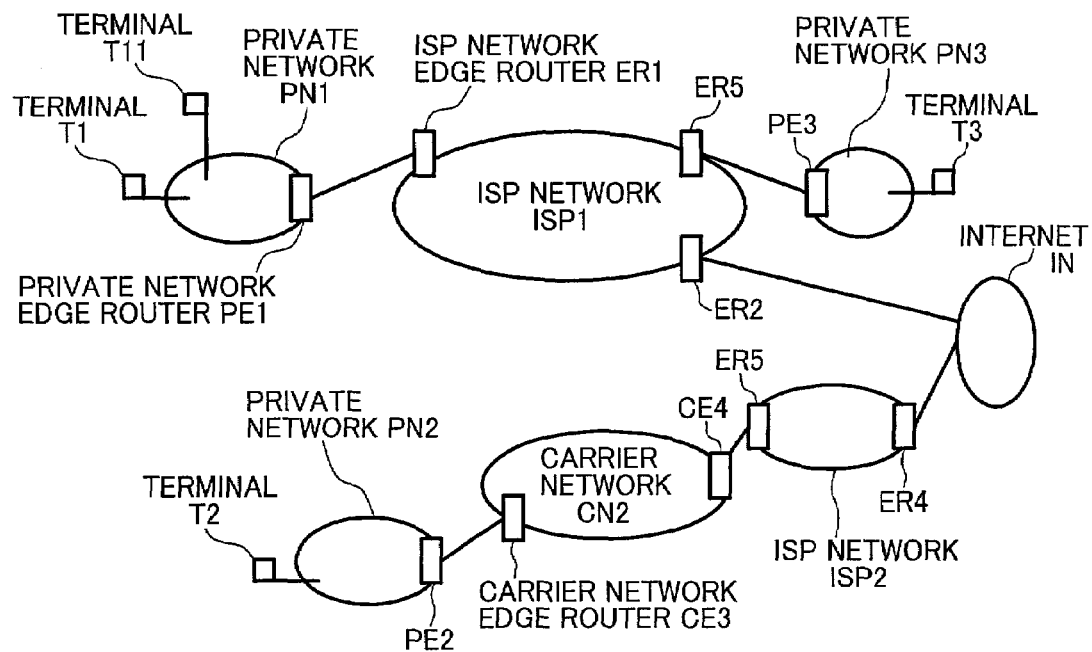
FIG. 10 is a concept chart for denoting a configuration of a network that uses the edge node of the present invention.

Hereunder, a preferred embodiment of a packet transferring apparatus of the present invention, that is, an edge node will be described with reference to FIG. 2. The edge node may be, for example, any of the edge routers PE1 and PE2 of a private network, the edge routers ER1 and ER2 of an ISP network, and edge routers CE1 and CE2 of a carrier network shown respectively in FIG. 1. An edge node is composed of input line interfaces 30-1, 30-n used to house input lines that receive data link layer packets shown in FIGS. 5 and 6 from external; output line interfaces 50-1, 50-n used to house output lines that send data link layer packets to external; input packet processors 13-1, 13-m used to process data link layer packets received by the input line interfaces; a switch 12 used to transfer data from the input packet processors to the output packet processors in the edge node; output packet processors 14-1, 14-m used to process data link packets to be sent out; and a controller 11 used to control those devices. In addition to the input lines, the output lines, the input line interfaces, the output line interfaces, the input packet processors, and the output packet processors, the switch, and the controller may also be plurally provided in each packet transferring apparatus.

The input line interface 30-1/30-n recognizes a physical signal entered from an input line as a data link layer packet, then transfers the data link layer packet to the input packet processor 20.

The input packet processor 20 processes received data link layer packets and transfers the processed packets to the switch 12. The switch 12 transfers packets received from the input packet processor 20 to the output packet processor 40. The output packet processor 40 processes packets received from the switch 12, then transfers the processed packets to the output line interface 50-1/50-n as data link layer packets.

The output line interface 50 receives data link layer packets from the output packet processor 40 and converts those packets to physical signals and output the physical signals to an output line.

Figure 3:
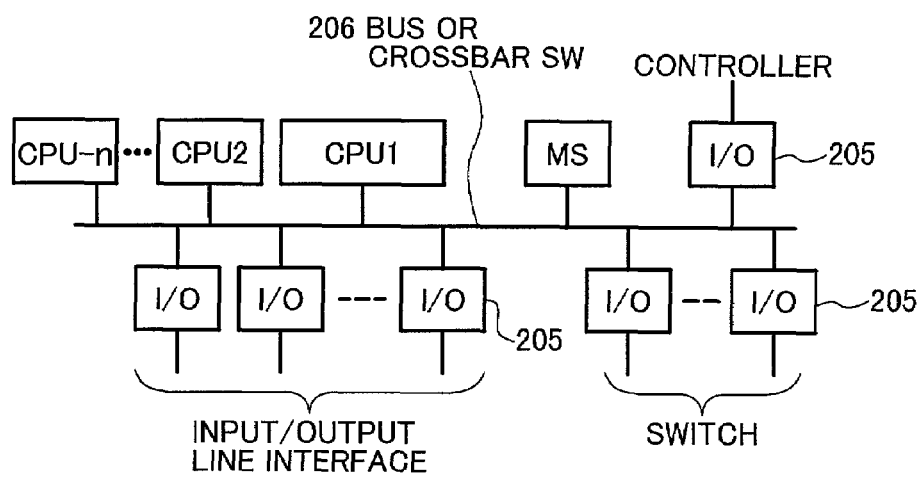
FIG. 3 is a block diagram of a packet processor provided in the edge node of the present invention.
Figure 4:
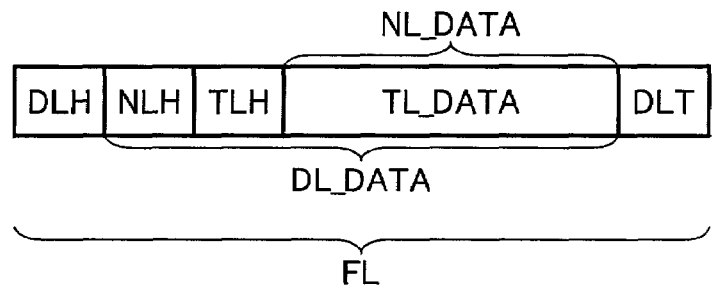
FIG. 4 is a concept chart for denoting a configuration of a packet.

Next, a configuration of the input packet processor 20 and a configuration of the output packet processor 40 will be described with reference to FIG. 3. The input packet processor 20 is composed of at least one CPU; a storage MS; and plural I/O devices 205. The I/O devices have the CPU 1, the CPU 2, etc., or the storage MS, the input and output line interfaces, the switch, or the controller, connected to each other via a bus or crossbar switch. The input packet processor 20 and the output packet processor 40 in this embodiment are similar in configuration and they cooperate with each other so as to process packets.

FIG. 9 shows a logical configuration of the packet transferring apparatus of the present invention. Each of the configurations of the above items can be realized by data processings executed in one or more CPUs (CPU1 and CPU2) and a storage MS shown in FIG. 3. The configuration may also be realized only by hardware items. According to this method, the configuration includes a packet processor selector 100 that extracts header information from a packet inputted from an input interface or switch and recognizes the state of the data flow of the packet; a table maintainer 101 that maintains updated table information; a table searcher 102 that searches table information; an authorizing request processor 103 that sends an authorizing result obtained through an authorizing service in the communication network to the table maintainer 101; a table 104; a packet processor 300 prepared for each packet processing to be performed according to a table searching result; and a port selector 400 that transfers packets to the switch or output interface.

The packet processor selector 100 obtains a data link layer identifier IN 12 from the information included in the data link layer header DLH or trailer DLT of each input packet. The packet processor selector 100 also obtains a network layer identifier IN 21 from the information included in the network layer header NLH and a transport layer identifier IN 22 from the information included in the transport layer header TLH (see FIGS. 4, 5, 7, and 8). For example, the data link layer identifier includes a source address, and a destination address, and a session identifier of the data link layer. For example, PPP over Ethernet denoted by RFC2516 obtains a session identifier from the data link layer header DLH of each input packet. The network layer identifier includes a source address, a destination address, and a upper layer protocol identifier of the network layer. The network layer header is, for example, the Internet Protocol (IP) denoted by RFC791. Information to be extracted in the transport layer is a transport layer address and a transport layer state flag. The transport layer header is, for example, TCP denoted by RFC793 and UDP denoted by RFC768. A terminal that outputs a packet is identified by the input line IN 11, the data link layer identifier IN 12, or the network layer identifier IN 21.

The table searcher 102 searches a table that records output information according to a search key, which is input information IN 1 or IN 2 extracted by the packet processor selector 100 from an input packet.

The packet processor selector 100 instructs a packet processor 300 to make a data processing according to a search result obtained from the table searcher 102, that is, the output information OUT1 or OUT2.

FIG. 7 shows an example of a table that uses data link layer header information to identify a packet flow and FIG. 8 shows an example of a table that uses one or both of network layer header information and transport layer header information to identify a packet flow.

In the example shown in FIG. 7, input information IN1 is composed of an input line IN11 and an input data link layer identifier IN12 obtained from an input packet. The input information IN1 is used as a search key to search the table shown in FIG. 7, thereby obtaining output information OUT1. The output information OUT1 is composed of an output line OUT11, an output data link layer identifier OUT12, a data link layer (DL) state OUT13, and a packet filtering condition OUT14 output respectively from a packet. The processing identifier OUT15 specifies a processing to be executed for a packet.

In the example shown in FIG. 8, input information IN2 is composed of an input network (NL) layer identifier IN21 and an input transport (TL) layer identifier IN22 obtained from an input packet. The input information IN2 is used as a search key to search the table shown in FIG. 8, thereby obtaining output information OUT2. The output information OUT2 is composed of an output network layer (NL) identifier OUT11, a transport layer (TL) state OUT22, a packet filtering condition OUT23, a processing identifier OUT24, and an output data link layer identifier OUT25.

Figure 1:
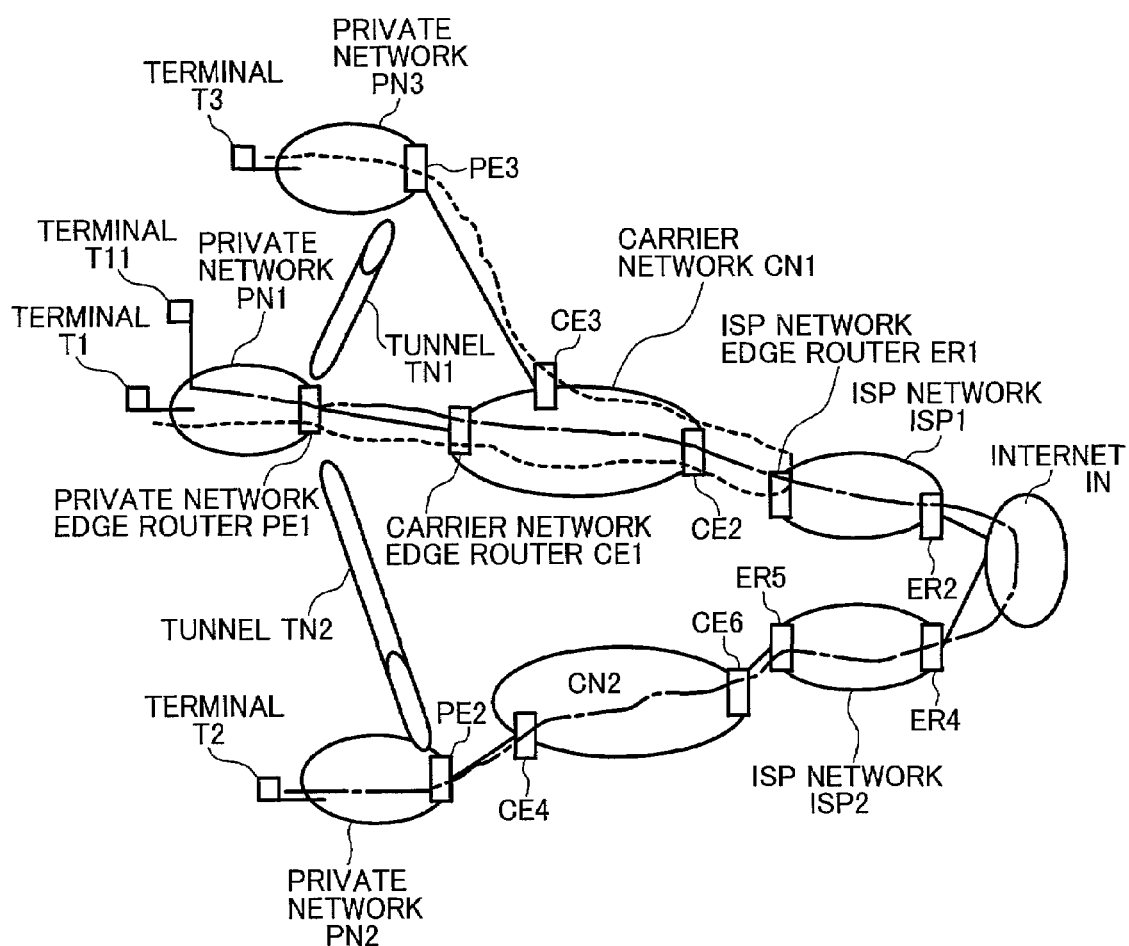
FIG. 1 is a concept chart for denoting a configuration of a network that uses an edge node of the present invention.
Figure 2:
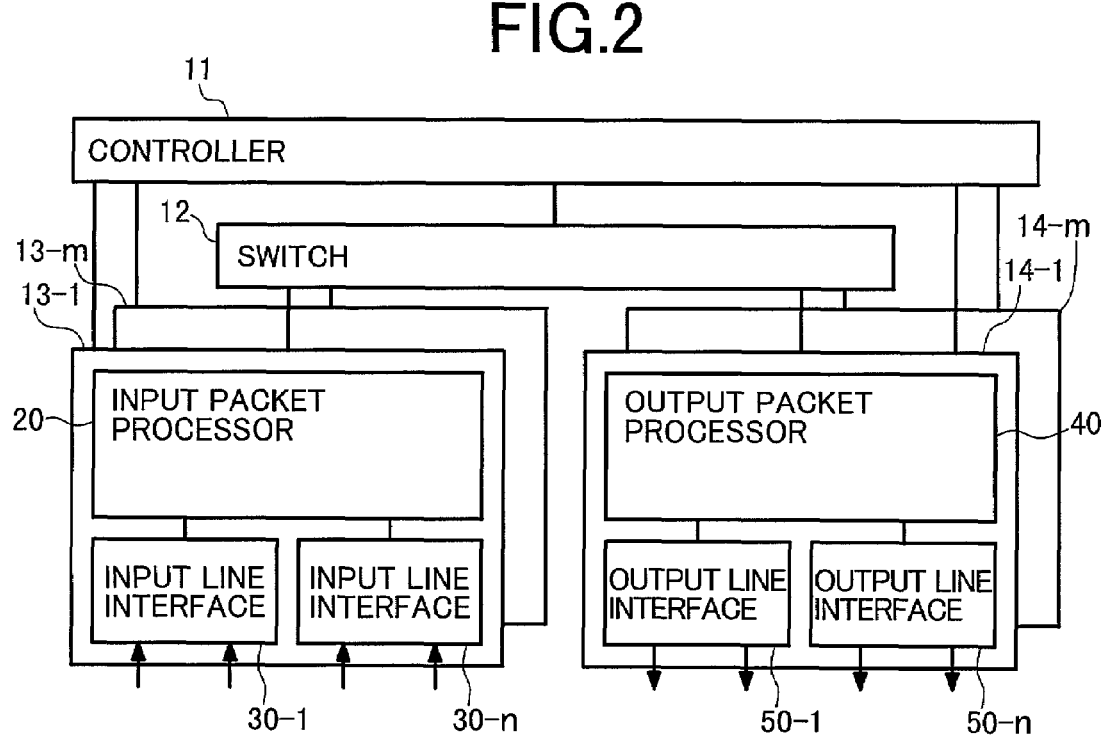
FIG. 2 is a block diagram of the edge node of the present invention.

The private network edge router PE1 shown in FIG. 1 can identify a terminal from which a packet is output according to the input data link layer identifier IN12. In the example shown in FIG. 7, a packet received from the terminal T1 can be decided by the processor selector that searches the table shown in FIG. 7 using the input information IN1 extracted from the packet as a search key. In other words, the packet output from the terminal T1 has an input data link layer identifier IN12, which is 0002. The packet output from the terminal T11 has an input data link layer identifier IN12, which is 0010. Both of the terminals can thus be identified.

In the example shown in FIG. 7, a packet flow from the terminal T1 can be decided by changing the table entry DL state OUT13 to data communication for an input line IN11 whose user is identified by the authorizing request processor 103 and the input data link layer identifier (session identifier) IN12. A network to which an output line is connected can be identified according to the output data link layer identifier (session identifier) OUT12 held in the corresponding table entry. In the same way, a packet from the terminal T11 can be identified. This is why whether to encrypt a packet can be decided according to a processing identifier OUT15 assigned appropriately to the terminal.

The table maintainer 102 decides whether or not the data link layer state and the packet filtering condition are changed according to the information extracted by the processor selector 100 and registers the results in table entries. The table maintainer 102 also decides whether to execute such a processing as encryption and registers the processing identifier in a table entry. In the example shown in FIG. 7, the state OUT11 of the data link layer (DL) in a table entry means the arrival history of a data link layer packet with respect to each input data link layer identifier IN12. In the example shown in FIG. 8, the state OUT21 of the transport layer (TL) means the arrival history of a transport layer packet with respect to each input transport layer identifier IN22.

The authorizing request processor 103 authorizes each user by communicating with the authorizing service provided outside or inside a packet transferring apparatus (not shown). Each input packet includes the information of the user who has generated the packet. The user information is information of the above layer included in a data link layer identifier, a network layer identifier, and/or transport layer data. The authorizing report process sends the user information to the authorizing service and receives the authorizing result. According to the authorizing result, the authorizing request processor registers/deletes table entries of a packet flow to which the packet belongs and reports whether to change the packet filtering condition OUT14 to the table maintainer. The table holds the information as an entry.

A packet processor 300 is selected by a processing identifier, then enabled to operate.

Next, a description will be made for a packet processor 300 with reference to FIG. 1, which shows a configuration of a network that uses the packet transferring apparatus of the present invention as each edge router. The edge router PE1 of the first private network PN1 and the edge router PE3 of the third private network are connected to the edge router ER1 of the first ISP network ISP1 via a carrier network CN1 respectively. The edge router PE2 of the second private network PN2 is connected to the edge router ER5 of the second ISP network ISP2 via the carrier network CN2. The private networks PN1 and PN2 are connected to each other via the tunnel TN2. The private networks PN1 and the PN3 are connected to each other via the tunnel TN1.

Next, the operation of the present invention in a wide range network will be described with reference to FIG. 1 again. When the table shown in FIG. 8 is used, for a packet sent from the edge router PE1 of a private network shown in FIG. 1 to the terminal T3 denoted by a broken line, that is, connected to the edge router PE1 via a route (tunnel TN1) that requires no encryption in a contracted ISP, the capsulation process 301 for tunneling is selected according to the processing identifier OUT15. When the packet is sent to the terminal T2 denoted by an alternate long and short dash line, that is, connected to the edge router PE1 via a route (tunnel TN2) that passes the Internet IN and requires encryption, however, the encrypt process 303 is selected, then the encapsulation process 301 for tunneling is selected according to the processing identifier.

On the other hand, when the table shown in FIG. 8 is used, for a packet sent to the edge router PE1 of a private network shown in FIG. 1 from the terminal T3 denoted by a broken line, that is, connected to the edge router PE1 via a route (tunnel TN1) that requires no encryption in a contracted ISP, the decapsulation process 302 for tunneling is selected according to the processing identifier OUT15. When the packet is sent from the terminal T2 denoted by an alternate long and short dash line, that is, connected to the edge router PE1 via a route (tunnel TN2) that passes the Internet IN and requires encryption, however, the decapsulation process 302 for tunneling is selected, then decrypt process 304 is selected according to the processing identifier. When a data compress/expand process is needed for a packet, the packet is transferred to the compress process 305 or expand process 306. When all the necessary processes are completed for the packet, the packet processor 300 sends the packet data to the port selector 400. The port selector 400 then transfers the packet data to the switch 12 or output line interface 50. The packet processor selector 100 also executes the same processes for other packets transferred from the switch 12.

Figure 11:
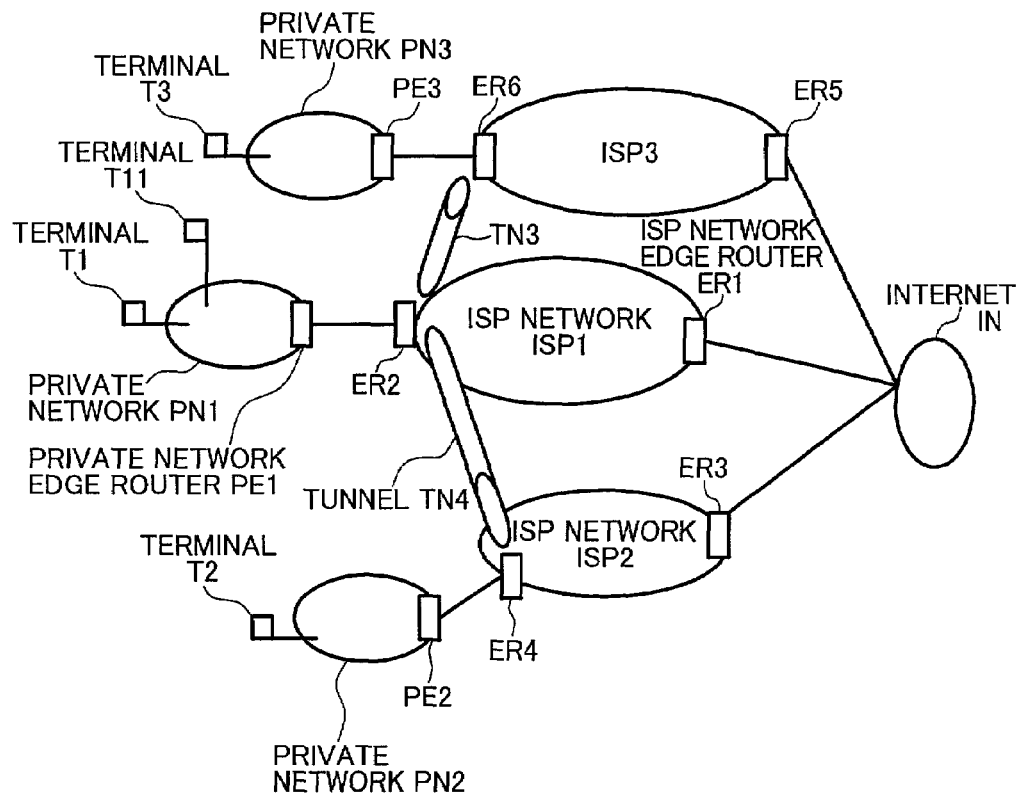
FIG. 11 is a concept chart for denoting a configuration of a network that uses the edge node of the present invention.

Next, a description will be made for an embodiment in which a virtual private network VPN is configured with use of the packet transferring apparatus of the present invention and an ISP edge router with reference to FIG. 11. In this case, packets in the private network are encapsulated by the ISP edge router ER2 and handled as tunnel packets. The ISP network edge route ER2 adds a new network layer header T_NLH to each packet as a encapsulation header. The new network layer header T_NLH is needed for the packet to pass the ISP network. Each packet from the edge router PE1 of the private network PN1 can be recognized as a packet received from the terminal T1 due to the data link layer identifier and the network layer identifier. In the same way, each packet from the terminal T11 can be recognized. Encryption is done for each packet according to the processing identifier held in the table. In this case, the Internet connection service provider can provide the users with such additional value services as encrypted tunneling, etc. in behalf of each user who connects the ISP network ISP1 managed by the service provider.

According to the present invention, therefore, it is possible to recognize each terminal or user from which a packet is received and to decide the destination of the packet. It is thus possible to identify the user or process content, thereby changing the processing of respective packets and the processing of only part of each packet flow so as to discriminate the processing of each packet passing an edge node from others. In addition, each user can select and encrypt a target packet, thereby only target packets that pass through a route that requires encryption for each user can be encrypted. Consequently, it is possible to perform such a processing as encryption that requires many calculations selectively in an edge node. Because a packet transferring apparatus that houses fast lines can be used to encrypt data flows, the address information of each packet is concealed in a private network even when the packet passes through a network managed by a manager other than that of the private network. The private network addresses can thus be protected from malicious accesses such as service disabling attacks.

The manager of the packet transferring apparatus that employs this method can provide each user with discriminated packet processing services.

We claim:

1. A packet processing method, comprising the steps of:
    providing a packet processing apparatus that incorporates a processor selector for extracting identification information of a transport layer that denotes a characteristic of a data flow composed of an input packet from said packet, a processing selecting table for holding a pair of data items that are identification information and a processing to be performed for said packet in advance, a table searcher for searching information in said processing selecting table according to a search key, which is identification information extracted by said processor selector, a plurality of independent packet processors for processing said packet according to a result of searching in said table, and a port selector for sending said processed packet;
    extracting identification information that denotes a characteristic of a data flow composed of an input packet from the header information of said packet, wherein said packet processors are one of a plurality of types of packet processors, each being independent for a processing type to be performed for packets;
    extracting a transport layer state based on said identification information of said transport layer, wherein said transport layer state indicates an arrival history of a packet with respect to each identification information of said transport layer; and
    selecting a processing to be performed for the data of a packet in a packet flow for each input packet flow.

2. The packet processing method according to claim 1, wherein said processing is selected according to an input line to which said packet flow is inputted.

3. The packet processing method according to claim 1, wherein said processing is selected according to an identifier included in said packet data.

4. The packet processing method according to claim 1, wherein said processing is selected by referring to a table where an input line to which said packet flow is inputted and a processing to be selected are corresponded to each other.

5. The packet processing method according to claim 1, wherein said processing is selected by referring to a table where an identifier included in said packet data and a processing to be selected are corresponded to each other.

6. The packet processing method according to claim 1, wherein a processing to be performed for packet data is at least one of encapsulation, decapsulation, encryption, decryption, compression, and expansion.

7. A packet processing apparatus, comprising:
    a processor selector for extracting identification information from a transport layer that denotes a characteristic of a data flow composed of an input packet from said packet;
    a processing selecting table for holding a pair of data items that are identification information and a processing to be performed for said packet in advance;
    a table searcher for searching information in said processing selecting table according to a search key, which is identification information extracted by said processor selector;
    a plurality of independent packet processors for processing said packet according to a result of searching in said table; and
    a port selector for sending said processed packet, wherein said processor selector further extracts a transport layer state based on said identification information of said transport layer, and
    said transport layer state indicates an arrival history of a packet with respect to each identification information of said transport layer.

8. The packet processing apparatus according to claim 7, wherein identification information that denotes a characteristic of a data flow composed of an input packet is extracted from the header information of said packet.

9. The packet processing apparatus according to claim 8, wherein said identification information that denotes a characteristic of said data flow is at least one of a source address and a destination address.

10. The packet processing apparatus according to claim 8, wherein said packet processor is one of a plurality of types of packet processors, each being independent for a processing type to be performed for packets.

11. A packet processing apparatus, comprising:
    a processor selector for deciding the source of an input packet;
    a processing selecting table for holding a pair of data items that are identification information of a transport layer and a processing to be performed for said packet in advance;

a table searcher for searching information in said processing selecting table according to a search key, which is a source of said packet decided by said processor selector;

a plurality of packet processors for processing said packet according to a result of searching in said table; and a port selector for sending said processed packet, wherein said processor selector further extracts a transport layer state based on said identification information of said transport layer, and said transport layer state indicates an arrival history of a packet with respect to each identification information of said transport layer.

12. The packet processing apparatus according to claim 11, wherein an input line to which said packet is inputted is decided as the source of said packet.

13. The packet processing apparatus according to claim 11, wherein the source of said inputted packet is decided according to the header information of said packet.

* * * * *